United States Patent
Bugenhagen

(10) Patent No.: US 11,516,218 B2
(45) Date of Patent: Nov. 29, 2022

(54) METHOD AND SYSTEM FOR IMPLEMENTING CUSTOMER RESOURCE USE AS A SERVICE

(71) Applicant: CenturyLink Intellectual Property LLC, Broomfield, CO (US)

(72) Inventor: Michael K. Bugenhagen, Leawood, KS (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 371 days.

(21) Appl. No.: 16/298,361

(22) Filed: Mar. 11, 2019

(65) Prior Publication Data

US 2020/0186531 A1 Jun. 11, 2020

Related U.S. Application Data

(60) Provisional application No. 62/777,666, filed on Dec. 10, 2018.

(51) Int. Cl.
| | |
|---|---|
| *H04L 12/24* | (2006.01) |
| *H04L 41/0803* | (2022.01) |
| *H04L 9/40* | (2022.01) |
| *G06Q 30/00* | (2012.01) |
| *H04L 67/12* | (2022.01) |
| *H04L 67/51* | (2022.01) |

(52) U.S. Cl.
CPC .......... *H04L 63/101* (2013.01); *G06Q 30/01* (2013.01); *H04L 67/12* (2013.01); *H04L 67/51* (2022.05)

(58) Field of Classification Search
CPC ....... H04L 63/101; H04L 67/16; H04L 67/12; H04L 63/105; G06Q 30/01; H04W 12/086; H04W 4/70; Y04S 40/18; Y04S 40/20
USPC .......................................................... 726/28
See application file for complete search history.

(56) References Cited

U.S. PATENT DOCUMENTS

| | | | | |
|---|---|---|---|---|
| 8,572,711 B1* | 10/2013 | Klau | ................... | H04L 63/0807 726/29 |
| 9,853,959 B1* | 12/2017 | Kapczynski | ............ | H04L 63/08 |
| 2002/0032640 A1* | 3/2002 | La | .......................... | G06Q 40/06 705/37 |
| 2006/0153122 A1* | 7/2006 | Hinman | .................. | H04L 67/04 370/328 |
| 2008/0316982 A1* | 12/2008 | Murty | .................. | H04W 48/02 370/338 |

(Continued)

*Primary Examiner* — Ario Etienne
*Assistant Examiner* — Elizabeth Kassa

(57) ABSTRACT

Novel tools and techniques are provided for implementing customer resource telemetry and use as a service. In various embodiments, a computing system might receive, from a user, a request to access at least one network-accessible resource associated with a customer of a service provider, the user being unassociated and unrelated with the customer; might identify at least one of a user identification, a company, or a class of user associated with the user; might determine whether at least one resource record associated with the customer indicates that the user has permission to access the at least one network-accessible resource, based on the identification. If so, the computing system might provide the user with access to the at least one network-accessible resource associated with the customer. If not, the computing system might deny, to the user, access to the at least one network-accessible resource associated with the customer.

12 Claims, 9 Drawing Sheets

(56) References Cited

U.S. PATENT DOCUMENTS

| | | | | |
|---|---|---|---|---|
| 2013/0006673 A1* | 1/2013 | Hurston | G06Q 30/04 | 705/4 |
| 2013/0007837 A1* | 1/2013 | King | H04L 63/1433 | 726/1 |
| 2013/0097664 A1* | 4/2013 | Herz | G06F 16/337 | 726/1 |
| 2013/0204787 A1* | 8/2013 | Dubois | G06Q 20/40 | 705/44 |
| 2015/0341368 A1* | 11/2015 | Roth | G06F 21/00 | 726/4 |
| 2016/0180345 A1* | 6/2016 | Canpolat | H04L 67/306 | 705/26.1 |
| 2016/0352753 A1* | 12/2016 | Roth | G06F 21/31 | |
| 2016/0358259 A1* | 12/2016 | Cucchiara | G06Q 40/06 | |
| 2017/0026472 A1* | 1/2017 | Bugenhagen | H04L 63/10 | |
| 2017/0163507 A1* | 6/2017 | Pai | H04L 41/5025 | |
| 2017/0279736 A1* | 9/2017 | Pitio | G06Q 20/027 | |
| 2017/0295181 A1* | 10/2017 | Parimi | H04L 63/1433 | |
| 2017/0359356 A1* | 12/2017 | Brandwine | H04L 63/08 | |
| 2018/0061149 A1* | 3/2018 | Arena | G07C 5/008 | |
| 2019/0166504 A1* | 5/2019 | Wu | H04W 48/08 | |
| 2019/0362087 A1* | 11/2019 | Ferrans | H04L 63/102 | |
| 2019/0370468 A1* | 12/2019 | Soby | G06F 21/57 | |

\* cited by examiner

METHOD AND SYSTEM FOR IMPLEMENTING CUSTOMER RESOURCE USE AS A SERVICE

CROSS-REFERENCES TO RELATED APPLICATIONS

This application claims priority to U.S. Patent Application Ser. No. 62/777,666 (the "'666 Application"), filed Dec. 10, 2018 by Michael K. Bugenhagen, entitled, "Method and System for Implementing Customer Resource Use as a Service," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing dissemination and access of network-accessible resources, and, more particularly, to methods, systems, and apparatuses for implementing customer resource telemetry and use as a service.

BACKGROUND

In the current data-driven environment, providers desire to sell customer "use" information, but have restrictions put upon them regarding what they are permitted to "sell" given that customer service use can be considered customer proprietary network information ("CPNI"), or have other privacy concerns attached to such information. To remedy this, providers typically have customers sign service agreements to opt-in to what customer information may be shared. This is usually done in a way that is cumbersome (using long software agreements or the like) and that is not at all clear to the customer. The veil between the customer and the provider in such cases is the provider terms of service.

Hence, there is a need for more robust and scalable solutions for implementing dissemination and access of network-accessible resources, and, more particularly, to methods, systems, and apparatuses for implementing customer resource telemetry and use as a service.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
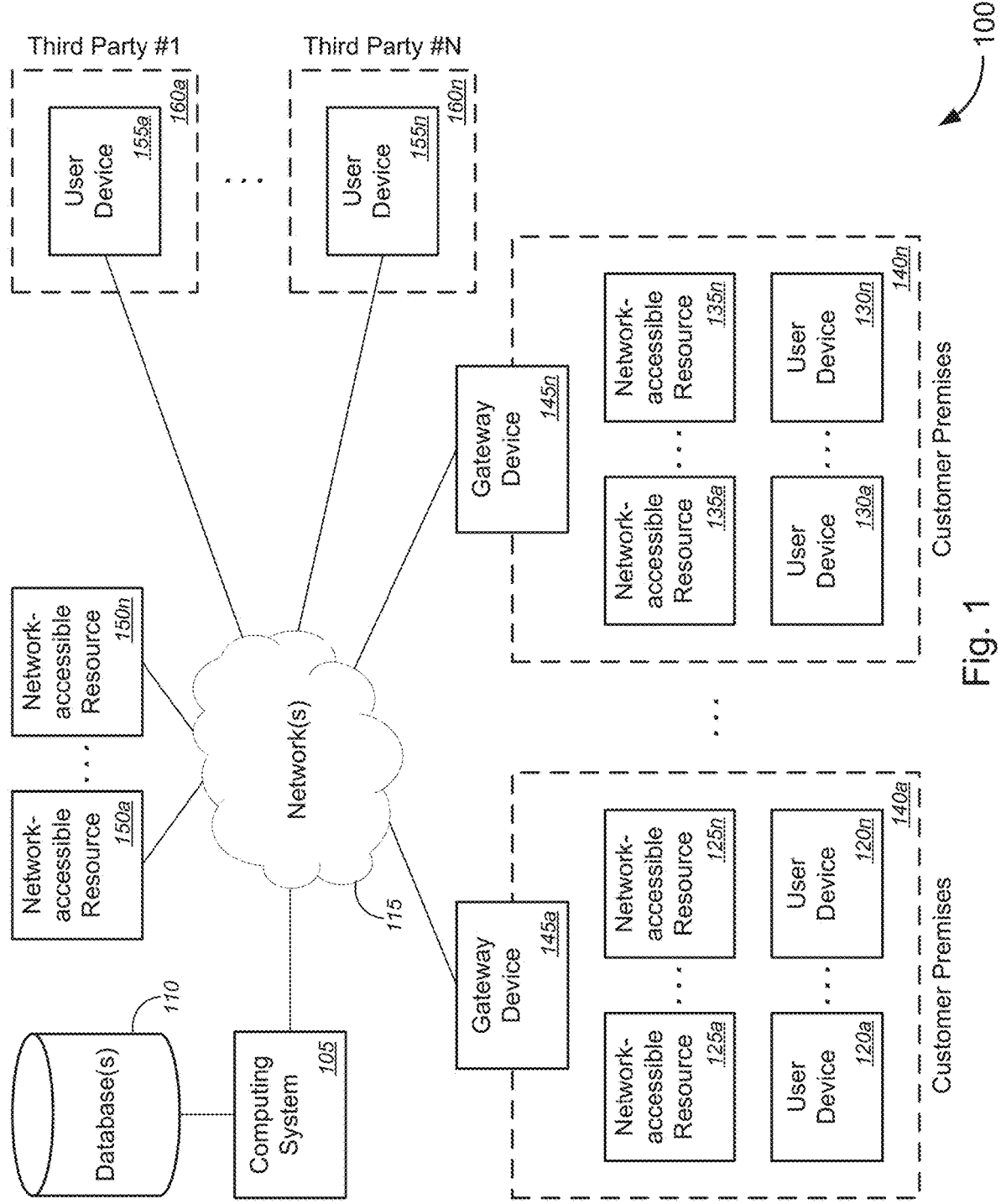
FIG. 1 is a schematic diagram illustrating a system for implementing customer resource use as a service, in accordance with various embodiments.

Various embodiments provide tools and techniques for implementing dissemination and access of network-accessible resources, and, more particularly, to methods, systems, and apparatuses for implementing customer resource telemetry and use as a service.

In some embodiments, a customer might create a "service interface" for $3^{rd}$ parties to access their resources by creating a "customer resource as a service" with which they can expose resource telemetry, and to even provide control of the resources to a $3^{rd}$ party via the service, and entitling the $3^{rd}$ party to otherwise access the resources and/or resource telemetry via the service. This approach of allowing customers to create secondary $3^{rd}$ party services forms a framework that enables a plurality of "customer resource as a service" implementations from IoT sharing of resources, to auditing and/or outsourcing business process functions, to other $3^{rd}$ party groups under a controlled service schema. In some cases, machine learning ("ML") application interfaces may be used for a customer to open a resource or a set of resources. In some instances, an artificial intelligence ("AI") application may be used to "read" information (e.g., telemetry), and might make changes to the resources to optimize the resource behavior. A plurality of $3^{rd}$ party relationships are enabled, and for the purposes of the application, only a smaller subset of implementations are described herein.

In various embodiments, a computing system might receive, from a user device or application associated with a third party user, a request to access at least one network-accessible resource (and/or information regarding the at least one network-accessible resource) associated with a customer among a plurality of customers of a service provider, the third party user being unassociated and unrelated with the customer. The computing system might identify at least one of a user identification ("ID") associated with the third party user, a company represented by the third party user, or a class (or type or group) of user associated with the third party user, and/or the like. The computing system might determine whether at least one resource record associated with the customer indicates that the third party user has permission to access the at least one network-accessible resource, based at least in part on the identified at least one of the user identification associated with the third party user, the company represented by the third party user, or the class (or type or group) of user associated with the third party user, and/or the like. Based on a determination that the at least one resource record associated with the customer indicates that the user has permission to access the at least one network-accessible resource, the computing system might provide the third party user with access to the at least one network-accessible resource associated with the customer. Based on a determination that the at least one resource record associated with the customer indicates that the user does not have permission to access the at least one network-accessible resource, the computing system might deny, to the third party user, access to the at least one network-accessible resource associated with the customer.

In some embodiments, the computing system might receive, from the customer of the service provider, one or more instructions to set, modify, or update the at least one resource record associated with the customer to set, modify, or update use permissions for the one or more resources associated with the customer. The computing system might further provide a user interface that provides the customer of the service provider with one or more options including at least one of: options to set, modify, or update the at least one resource record associated with the customer; options to set, modify, or update the use permissions for the one or more resources associated with the customer; options to set, modify, or update privacy settings associated with services provided to the customer; options to select any information brokers or agents with whom to share information and amount of information to share; options to purchase one or more services provided by the service provider; options to request customer resource use as a service ("CRUaaS") for at least one service provided by the service provider; or options to select amount of resources to share with third parties and corresponding compensation to the customer for such sharing of resources; and/or the like.

In some embodiments, the computing system might include, without limitation, one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system, and/or the like.

According to some embodiments, the network-accessible resources (and, in some cases, user devices, as well) associated with the customer might each include, but is not limited to, one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource, and/or the like. In some cases, the at least one edge network resource might include, without limitation, one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system, and/or the like. In some instances, one or more of the at least one telemetry resource or the at least one customer record resource might include, but is not limited to, one or more of at least one datastore containing state information associated with the at least one network-accessible resource, at least one datastore containing metrics data associated with the at least one network-accessible resource, or at least one datastore containing one or more attributes associated with the at least one network-accessible resource, and/or the like.

The various embodiments provide the customer with the options or capabilities to select or choose how to expose the use of his or her assets (which may be built by the customer or may be purchased, or subscribed to, through a service provider, or the like) to other users, entities, or companies, etc. (collectively, "third party users" or the like). The customer, in such cases, would have full and direct control over his or her own privacy by allowing or restricting access to that information. In some cases, cloud infrastructure as a service ("IaaS") might replace a customer buying compute resources with a customer leasing a compute facility. Should a provider create customer resource use as a service ("CRUaaS"), the provider, in fact, would be making a telemetry or use resource that a customer could control just like any other customer service he or she might lease, and also control which third party users have access to that resource.

These and other features and functionalities of the implementation of customer resource use as a service may be described in greater detail below with respect to FIGS. 1-7.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, resource dissemination system, network resource allocation system, and/or the like. In other aspects, certain embodiments, can improve the functioning of user equipment or systems themselves (e.g., resource dissemination system, network resource allocation system, etc.), for example, by receiving, with a computing system and from a user, a request to access at least one network-accessible resource associated with a customer of a service provider, the user being unassociated and unrelated with the customer; identifying, with the computing system, at least one of a user identification associated with the user, a company represented by the user, or a class of user associated with the user; determining, with the computing system, whether at least one resource record associated with the customer indicates that the user has permission to access the at least one network-accessible resource, based at least in part on the identified at least one of the user identification associated with the user, the company represented by the user, or the class of user associated with the user; based on a determination that the at least one resource record associated with the customer indicates that the user has permission to access the at least one network-accessible resource, providing, with the computing system, the user with access to the at least one network-accessible resource associated with the customer; and based on a determination that the at least one resource record associated with the customer indicates that the user does not have permission to access the at least one network-accessible resource, denying, to the user, access to the at least one network-accessible resource associated with the customer; and/or the like.

In particular, to the extent any abstract concepts are present in the various embodiments, those concepts can be implemented as described herein by devices, software, systems, and methods that involve specific novel functionality (e.g., steps or operations), such as, providing a customer of a service provider with a user interface that provides the customer with options and the ability to set up a customer resource use as a service ("CRUaaS") and to set, modify, or update resource records, use permissions, privacy settings, information brokers or agents with whom to share information, amount of information to share, amount of resources to share with third parties, amount of compensation to the customer for sharing resources, and/or the like. The CRUaaS would then provide third parties with access to network-accessible resources associated with the customer or deny such access, based at least in part on the use permissions and other settings provided by the customer; and/or the like, to name a few examples, that extend beyond mere conventional computer processing operations. These functionalities can produce tangible results outside of the implementing computer system, including, merely by way of example, providing a CRUaaS that enables a customer to control what resources to share with third parties and how much of the resources to share, and/or the like, at least some of which may be observed or measured by customers and/or service providers.

In an aspect, a method might comprise receiving, with a computing system and from a user, a request to access at least one network-accessible resource associated with a customer of a service provider, the user being unassociated and unrelated with the customer; identifying, with the computing system, at least one of a user identification associated with the user, a company represented by the user, or a class of user associated with the user; and determining, with the computing system, whether at least one resource record associated with the customer indicates that the user has permission to access the at least one network-accessible resource, based at least in part on the identified at least one of the user identification associated with the user, the company represented by the user, or the class of user associated with the user. The method might also comprise, based on a determination that the at least one resource record associated with the customer indicates that the user has permission to access the at least one network-accessible resource, providing, with the computing system, the user with access to the at least one network-accessible resource associated with the customer. The method might further comprise, based on a determination that the at least one resource record associated with the customer indicates that the user does not have permission to access the at least one network-accessible resource, denying, to the user, access to the at least one network-accessible resource associated with the customer.

In some embodiments, the computing system might comprise one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system, and/or the like. According to some embodiments, the at least one network-accessible resource associated with the customer might each comprise one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource, and/or the like. In some cases, the at least one edge network resource might comprise one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system, and/or the like. In some instances, one or more of the at least one telemetry resource or the at least one customer record resource might comprise one or more of at least one datastore containing state information associated with the at least one network-accessible resource, at least one datastore containing metrics data associated with the at least one network-accessible resource, or at least one datastore containing one or more attributes associated with the at least one network-accessible resource, and/or the like.

According to some embodiments, the method might further comprise receiving, with the computing system and from the customer of the service provider, one or more instructions to set, modify, or update the at least one resource record associated with the customer to set, modify, or update use permissions for the one or more resources associated with the customer. In some cases, the method might further comprise providing, with the computing system, a user interface that provides the customer of the service provider with at least one of: options to set, modify, or update the at least one resource record associated with the customer; options to set, modify, or update the use permissions for the one or more resources associated with the customer; options to set, modify, or update privacy settings associated with services provided to the customer; options to select any information brokers or agents with whom to share information and amount of information to share; options to purchase one or more services provided by the service provider; options to request customer resource use as a service ("CRUaaS") for at least one service provided by the service provider; or options to select amount of resources to share with third parties and corresponding compensation to the customer for such sharing of resources; and/or the like.

In some embodiments, providing, with the computing system, the user with access to the at least one network-accessible resource associated with the customer might comprise providing, with a host computing system, the user with access to the at least one network-accessible resource associated with the customer, based at least in part on configuration settings provided by the customer. Alternatively, providing, with the computing system, the user with access to the at least one network-accessible resource associated with the customer might comprise providing, with a host computing system, the user with access and control of a wireless service set identifier ("SSID") for the at least one network-accessible resource, the wireless SSID having been previously setup by the customer as enabled by the host computing system, wherein the wireless SSID enables the user to access and control the at least one network-accessible resource.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a user, a request to access at least one network-accessible resource associated with a customer of a service provider, the user being unassociated and unrelated with the customer; identify at least one of a user identification associated with the user, a company represented by the user, or a class of user associated with the user; determine whether at least one resource record associated with the customer indicates that the user has permission to access the at least one network-accessible resource, based at least in part on the identified at least one of the user identification associated with the user, the company represented by the user, or the class of user associated with the user; based on a determination that the at least one resource record associated with the customer indicates that the user has permission to access the at least one network-accessible resource, provide the user with access to the at least one network-accessible resource associated with the customer; and based on a determination that the at least one resource record associated with the customer indicates that the user does not have permission to access the at least one network-accessible resource, deny, to the user, access to the at least one network-accessible resource associated with the customer.

In some embodiments, the apparatus might comprise one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system, and/or the like. According to some embodiments, the at least one network-accessible resource associated with the customer might each comprise one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource, and/or the like. In some cases, the at least one edge network resource might comprise one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system, and/or the like. In some instances, one or more of the at least one telemetry resource or the at least one customer record resource might comprise one or more of at least one datastore containing state information associated with the at least one network-accessible resource, at least one datastore containing metrics data associated with the at least one network-accessible resource, or at least one datastore containing one or more attributes associated with the at least one network-accessible resource, and/or the like.

According to some embodiments, the set of instructions, when executed by the at least one processor, might further cause the apparatus to: receive, from the customer of the service provider, one or more instructions to set, modify, or update the at least one resource record associated with the customer to set, modify, or update use permissions for the one or more resources associated with the customer, and/or the like. In some cases, the set of instructions, when executed by the at least one processor, might further cause the apparatus to: provide a user interface that provides the customer of the service provider with at least one of: options to set, modify, or update the at least one resource record associated with the customer; options to set, modify, or update the use permissions for the one or more resources associated with the customer; options to set, modify, or update privacy settings associated with services provided to the customer; options to select any information brokers or agents with whom to share information and amount of information to share; options to purchase one or more services provided by the service provider; options to request customer resource use as a service ("CRUaaS") for at least one service provided by the service provider; or options to select amount of resources to share with third parties and corresponding compensation to the customer for such sharing of resources; and/or the like.

In some embodiments, providing the user with access to the at least one network-accessible resource associated with the customer might comprise providing, with a host computing system, the user with access to the at least one network-accessible resource associated with the customer, based at least in part on configuration settings provided by the customer. Alternatively, providing the user with access to the at least one network-accessible resource associated with the customer might comprise providing, with a host computing system, the user with access and control of a wireless service set identifier ("SSID") for the at least one network-accessible resource, the wireless SSID having been previously setup by the customer as enabled by the host computing system, wherein the wireless SSID enables the user to access and control the at least one network-accessible resource.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a user, a request to access at least one network-accessible resource associated with a customer of a service provider, the user being unassociated and unrelated with the customer; identify at least one of a user identification associated with the user, a company represented by the user, or a class of user associated with the user; determine whether at least one resource record associated with the customer indicates that the user has permission to access the at least one network-accessible resource, based at least in part on the identified at least one of the user identification associated with the user, the company represented by the user, or the class of user associated with the user; based on a determination that the at least one resource record associated with the customer indicates that the user has permission to access the at least one network-accessible resource, provide the user with access to the at least one network-accessible resource associated with the customer; and based on a determination that the at least one resource record associated with the customer indicates that the user does not have permission to access the at least one network-accessible resource, deny, to the user, access to the at least one network-accessible resource associated with the customer.

In some embodiments, the computing system might comprise one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing dissemination and access of network-accessible resources, and, more particularly, to methods, systems, and apparatuses for implementing customer resource telemetry and use as a service, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing customer resource use as a service, in accordance with various embodiments.

In the non-limiting embodiment of FIG. 1, system 100 might comprise a computing system 105 and corresponding database(s) 110 that is local to the computing system 105. In some cases, the database(s) 110 might be external, yet communicatively coupled, to the computing system 105. In other cases, the database(s) 110 might be integrated within the computing system 105. In some embodiments, the computing system 105 might include, without limitation, one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system, and/or the like.

According to some embodiments, system 100 might further comprise network(s) 115. The network(s) 115 might each include, but is not limited to, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) might include an access network of the service provider (e.g., an Internet service provider ("ISP")). In another embodiment, the network(s) might include a core network of the service provider, and/or the Internet.

The system 100 might further comprise one or more user devices 120*a*-120*n* (collectively, "user devices 120" or the like), one or more network-accessible resources 125*a*-125*n* (collectively, "network-accessible resources 125" or the like), one or more user devices 130*a*-130*n* (collectively, "user devices 130" or the like), one or more network-accessible resources 135*a*-135*n* (collectively, "network-accessible resources 135" or the like), and/or the like. In some cases, the user devices 120 and the network-accessible resources 125 might be disposed in customer premises 140*a*, while the user devices 130 and the network-accessible resources 135 might be disposed in customer premises 140*n*, the customer premises 140*a* and 140*n* being among a plurality of customer premises 140*a*-140*n* (collectively, "customer premises 140" or the like), each of which might be associated with a customer among a plurality of customers of a service provider that operates the computing system 105. System 100 might also comprise gateway devices 145*a*-145*n* (collectively, "gateway devices 145" or the like), each of which might be disposed in corresponding customer premises among the plurality of customer premises 140. In some instances, system 100 might further comprise one or more network-accessible resources 150*a*-150*n* (collectively, "network-accessible resources 150" or the like), which might be disposed external to the plurality of customer premises 140 and which might each be associated with at least one of the plurality of customers of the service provider. The system might additionally comprise one or more user devices 155*a*-155*n* (collectively, "user devices 155" or the like), each being associated with a corresponding third party user among a plurality of third party users #1 through #N 160*a*-160*n* (collectively, "third party users 160" or the like).

The computing system 105 might communicatively couple to gateway devices 145 (and/or user devices 120 and 130 and/or network-accessible resources 125 and 135 via gateway devices 145) each disposed in one of the plurality of customer premises 140. The computing system 105 might, in some cases, be communicatively coupled to network-accessible resources 150. In some instances, the computing system 105 might communicatively couple to user devices 155 associated with corresponding third party 160.

According to some embodiments, the network-accessible resources 125, 135, and/or 150 (and, in some cases, user devices 120 and/or 130, as well) associated with the customer might each include, but is not limited to, one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource, and/or the like. In some cases, the at least one edge network resource might include, without limitation, one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system, and/or the like. In some instances, one or more of the at least one telemetry resource or the at least one customer record resource might include, but is not limited to, one or more of at least one datastore containing state information associated with the at least one network-accessible resource, at least one datastore containing metrics data associated with the at least one network-accessible resource, or at least one datastore containing one or more attributes associated with the at least one network-accessible resource, and/or the like.

In operation, the computing system 105 or gateway device(s) 145 (collectively, "computing system" or the like) might receive, from a user device 155 associated with one of the third party users 160, a request to access at least one network-accessible resource 125, 135, and/or 150 (and, in some cases, user devices 120 and/or 130, as well; collectively, "at least one network-accessible resource" or the like) associated with a customer among the plurality of customers of the service provider, the third party user 160 being unassociated and unrelated with the customer. The computing system might identify at least one of a user identification ("ID") associated with the third party user 160, a company represented by the third party user 160, or a class (or type or group) of user associated with the third party user 160, and/or the like. The computing system might determine whether at least one resource record associated with the customer indicates that the third party user 160 has permission to access the at least one network-accessible resource, based at least in part on the identified at least one of the user identification associated with the third party user 160, the company represented by the third party user 160, or the class (or type or group) of user associated with the third party user 160, and/or the like. Based on a determination that the at least one resource record associated with the customer indicates that the user has permission to access the at least one network-accessible resource, the computing system might provide the third party user 160 with access to the at least one network-accessible resource associated with the customer. Based on a determination that the at least one resource record associated with the customer indicates that the user does not have permission to access the at least one network-accessible resource, the computing system might deny, to the third party user 160, access to the at least one network-accessible resource associated with the customer.

In some embodiments, the computing system might receive, from the customer of the service provider, one or more instructions to set, modify, or update the at least one resource record associated with the customer to set, modify, or update use permissions for the one or more resources associated with the customer. The computing system might further provide a user interface that provides the customer of the service provider with one or more options including at least one of: options to set, modify, or update the at least one resource record associated with the customer; options to set, modify, or update the use permissions for the one or more resources associated with the customer; options to set, modify, or update privacy settings associated with services provided to the customer; options to select any information brokers or agents with whom to share information and amount of information to share; options to purchase one or more services provided by the service provider; options to request customer resource use as a service ("CRUaaS") for at least one service provided by the service provider; or options to select amount of resources to share with third parties and corresponding compensation to the customer for such sharing of resources; and/or the like.

According to some embodiments, providing the user with access to the at least one network-accessible resource associated with the customer, in accordance with CRUaaS functionality, might comprise providing, with a host computing system, the user with access to the at least one network-accessible resource associated with the customer, based at least in part on configuration settings provided by the customer indicative that particular third party users or particular groups or types of third party users are permitted to access that the at least one network-accessible resource. Alternatively, providing the user with access to the at least one network-accessible resource associated with the customer, in accordance with CRUaaS functionality, might comprise providing, with a host computing system, the user with access and control of a wireless service set identifier ("SSID") for the at least one network-accessible resource, the wireless SSID having been previously set up by the customer as enabled by the host computing system, where the wireless SSID enables the user to access and control the at least one network-accessible resource. The customer might then be able to authorize third party users (e.g., anti-virus or anti-malware software service providers, medical service providers, home or business security service providers, and/or the like) to access and control the wireless SSID in the customer premises to permit these third party users to control the at least one network-accessible resource associated with the customer. The CRUaaS might allow user devices associated with the customer and/or the third party user(s) to look for the wireless SSID.

In a non-limiting example, customer A might have a printer that is accessible via a DSL modem or has a host API itself. The printer (like any other user device) can register itself as a host resource on the DSL modem. The customer might use a cloud broker to allow other computer systems to see the printer of customer A on the DSL modem registry. In some examples, a grandmother might allow her son to see her printer, video cameras, etc., as if her son were in his home. The resource (i.e., printer) can be accessed by a web browser via a URL. Alternatively, or additionally, the resource (i.e., printer) can be provided with an Internet protocol ("IP") address, or the like, that can subsequently be accessed by the son. In some embodiments, the CRUaaS system might provide host-to-host communication in which VMware-type hosts can map resources.

According to some embodiments, the customer might utilize the CRUaaS to provide third party users with access to use records (such as television viewing records, or the like). For example, an Internet service provider might deliver broadband service with a set-top box of the customer and the customer and/or a provider might provide a rating service (e.g., Nielsen or the like). The CRUaaS might provide records to third parties that the customer approves exposing. There can be different levels of exposure to such third parties, and such levels might be selectable by the customer via a user interface provided by the CRUaaS.

In some cases, the CRUaaS system might allow the customer to create a WiFi overlay (or other wireless overlay) per service and fully control it. In some instances, the customer might include an organization, and the CRUaaS system might provide a WiFi IaaS to enable the organization to create and control the WiFi overlay per service. The customer (either an individual or an organization) has control of the WiFi system (in terms of turning on or off the WiFi connection or communication), via the CRUaaS system, and the CRUaaS might then use the customer's own private overlay to manage end devices.

These and other functions of the system 100 (and its components) are described in greater detail below with respect to FIGS. 2-5.

Figure 2:
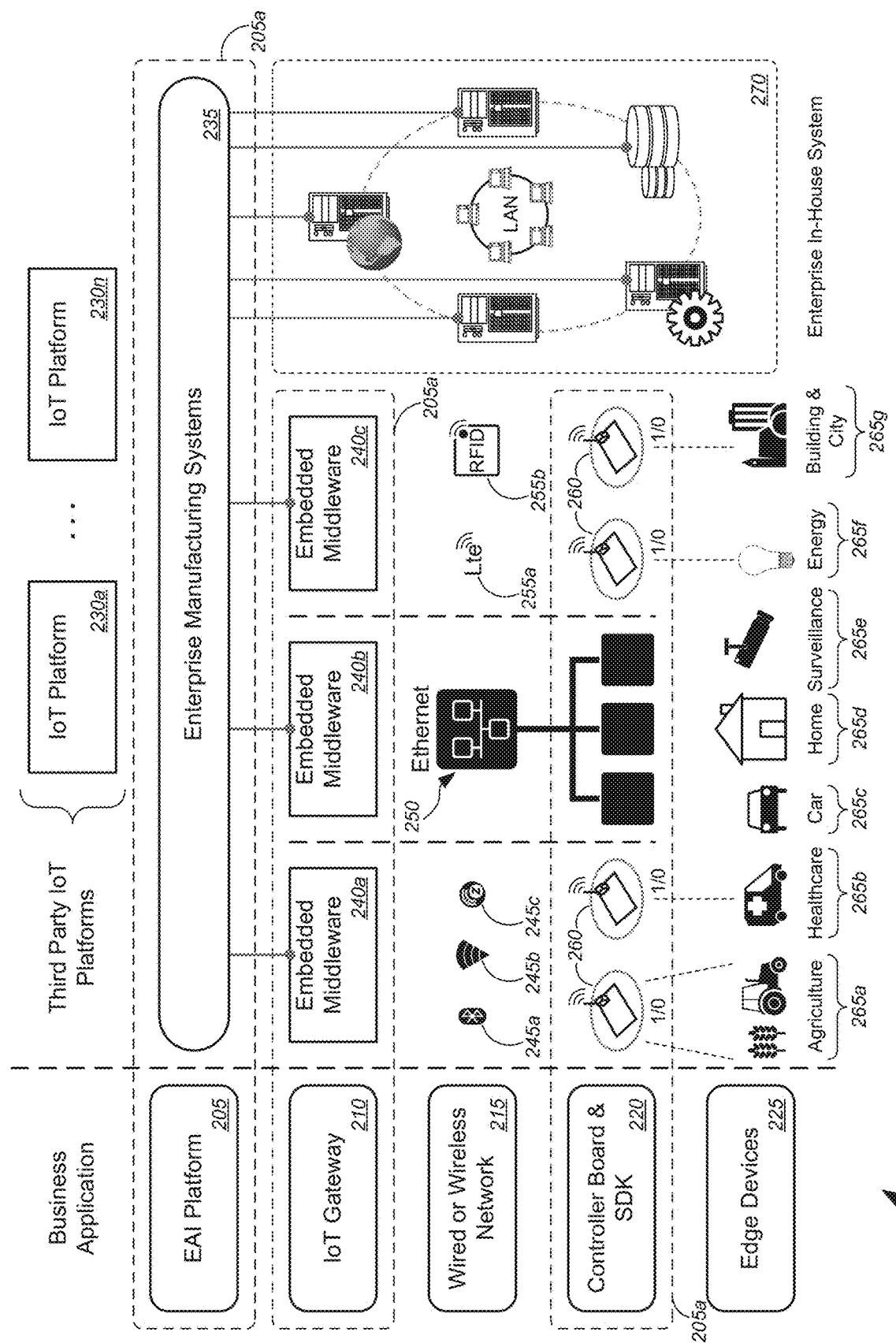
FIG. 2 is a schematic diagram illustrating another system for implementing customer resource use as a service, in accordance with various embodiments.

FIG. 2 is a schematic diagram illustrating another system 200 for implementing customer resource use as a service, in accordance with various embodiments.

In the non-limiting embodiment of FIG. 2, system 200 might comprise an enterprise application integration ("EAI") platform 205, an Internet of Things ("IoT") gateway(s) 210, a wired or wireless network(s) 215, one or more controller board and software development kit ("SDK") 220, one or more edge devices 225, one or more IoT platforms 230a-230n (collectively, "IoT platforms 230" or the like; which might be cloud-based and/or premises-based, or the like), one or more enterprise manufacturing systems 235, one or more embedded middleware 240a-240c, and/or the like. In some cases, the wired or wireless network(s) 215 might comprise at least one of a Bluetooth™ network(s) 245a, a WiFi network(s) 245b, a Z-wave network(s) 245c, an Ethernet network(s) 250, a long-term evolution ("LTE") mobile communication network(s) 255a (or other mobile network(s), or the like), a radio-frequency identification ("RFID") network(s) 255b, and/or the like. The controller board and SDK 220 might comprise a plurality of controller boards or SDKs 260, or the like. In some embodiments, the edge devices 225 might include, without limitation, one or more of at least one agricultural device 265a (as represented in FIG. 2 by, but not limited to, a tractor beside corn stalks), at least one healthcare device 265b (as represented in FIG. 2 by, but not limited to, an ambulance), at least one vehicle 265c (as represented in FIG. 2 by, but not limited to, an car), at least one home appliance 265d (as represented in FIG. 2 by, but not limited to, a house), at least one office device (not shown), at least one entertainment device (not shown), at least one surveillance device 265e (as represented in FIG. 2 by, but not limited to, a surveillance camera), at least one lighting device, at least one gas-operated device (not shown), at least one solar-powered device (not shown), at least one battery-powered device (not shown), at least one energy facility 265f (as represented in FIG. 2 by, but not limited to, a light bulb), or at least one building system 265g (as represented in FIG. 2 by, but not limited to, buildings), and/or the like. In some instances, system 200 might further comprise enterprise in-house system 270.

According to some embodiments, the one or more IoT platforms 230 (or third party IoT platforms, or the like) might utilize the EAI platform 205 to communicate, via the IoT gateway 210 and via the wired or wireless network(s) 215, with the controller board and SDK 220, which communicates with the edge devices 225. The system 200 might utilize IoT middleware 205a for the EAI platform 205, the IoT gateway 210, and/or the controller board and SDK 220. Alternatively, or additionally, the one or more IoT platforms 230 (or third party IoT platforms, or the like) might utilize the enterprise manufacturing systems 235 to communicate, via the embedded middleware 240a-240c and via the network(s) 245a-245c, 250, 255a, and 255b, with the controller boards and SDKs 260, which communicates with the devices 265a-265g, or the like. The enterprise manufacturing system 235 might also communicate with the various computing systems, network nodes, and other equipment associated with the enterprise in-house system 270.

Machine-to-machine ("M2M") and IoT architectures, such as shown in FIG. 2, might be built off a middleware (e.g., higher server layer) that acts as a registry for all devices. Each device may be accessed via a gateway (e.g., IoT gateway 210) that controls access to the device by third party users. In cloud implementations, however, the frameworks might be mis-aligned. In a cloud-based system, a host computing system or host device might have a registry in its host server software that can operate without middleware services. This means that a "stand-alone device" has its own resources and Internet protocol ("IP") addresses or uniform resource locator ("URL") to access them.

Figure 3:
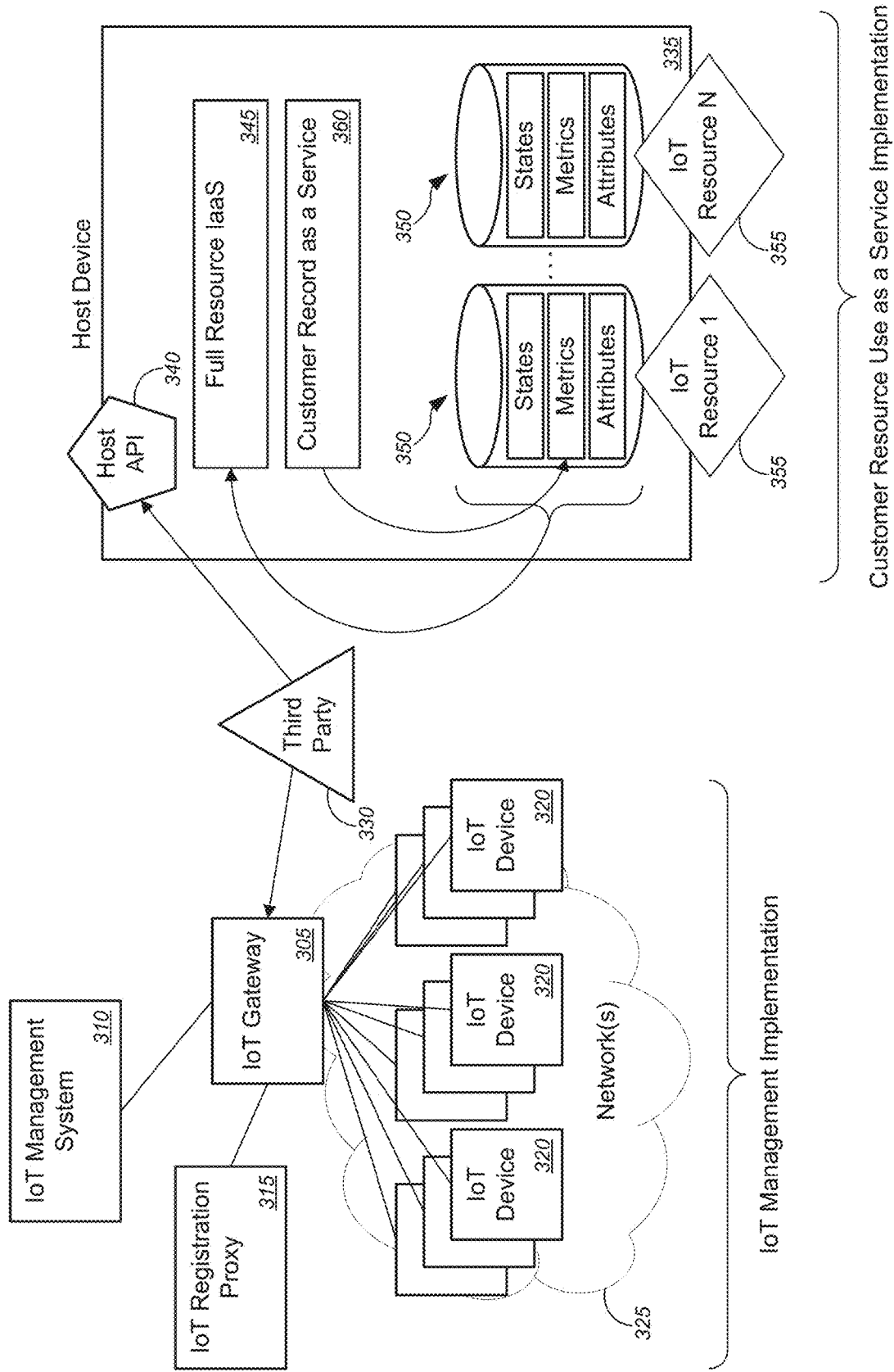
FIG. 3 is a schematic diagram illustrating yet another system for implementing customer resource use as a service, in accordance with various embodiments.

With reference to FIG. 3—which is a schematic diagram illustrating yet another system 300 for implementing customer resource use as a service, in accordance with various embodiments—, such IoT management implementation (as shown on the left-side of FIG. 3) might utilize an IoT gateway 305, an IoT management system 310, an IoT registration proxy 315, and a plurality of IoT devices 320 disposed within network(s) 325. The IoT management system 310 (which might correspond to the EAI platform 205 and/or the enterprise manufacturing systems 235 of FIG. 2, or the like) might receive, via IoT gateway 305, a request from a third party 330 to access at least one IoT device 320. In response to receiving the request, the IoT management system 310 might query the IoT registration proxy 315 via IoT gateway 305 and/or via network(s) 325 to determine whether the third party 330 has permission to access the at least one IoT device 320. If so, the IoT management system 310 might provide the third party 330 with access to the requested at least one IoT device 320 via IoT gateway 305. If not, the IoT management system 310 might deny the third party 330 from accessing the requested at least one IoT device 320.

On the other hand, a customer resource use as a service ("CRUaaS") implementation (as shown on the right-side of FIG. 3) might utilize a host device 335, a host application programming interface ("API") 340, a full resource infrastructure as a service ("IaaS") 345, one or more databases 350, one or more IoT resources #1 through #N 355, and a customer record as a service ("CRaaS") 360, and/or the like. In some cases, the one or more databases 350 might store at least one of states, metrics, and/or attributes for each corresponding IoT resource 355. Provision of the states, metrics, and/or attributes for each IoT resource 355 might be part of the full resource IaaS 345, while access to the metrics associated with an IoT resource 355 might be part of the CRaaS 360.

In operation, the host device 335 (which might correspond to computing system 105 or gateway device(s) 145 of FIG. 1, or the like) might receive, via host API 340, a request from third party 330 to access at least one IoT resource 355. In response to receiving the request, the host device 335 might determine whether the third party 330 has permission to access the at least one IoT resource 355 (in some cases, by analyzing the attributes of the IoT resource 355 as stored in database(s) 350, as the attributes might include information regarding permission settings for each IoT resource as set by the customer). Based on a determination that the third party 330 has permission to access the at least one IoT resource 355, the host device 335 might provide the third party 330 with access to the requested at least one IoT resource 355 via the host API 340. Based on a determination that the third party 330 does not have permission to access the at least one IoT resource 355, the host device 335 might deny the third party 330 from access to the requested at least one IoT resource 355. In some embodiments, access to the IoT resource 355 might include access and control of such IoT resource 355. Alternatively, or additionally, access to the IoT resource 355 might include access to metrics or telemetry data as measured, obtained, or provided by the IoT resource 355 (as in a customer record as a service). Alternatively, or additionally, access to the IoT resource 355 might include full access and control of the requested IoT resource 355 in addition to full access to the states, metrics, and attributes of the IoT resource 355 (as in a full resource IaaS).

In the CRUaaS implementation, the customer allows direct immediate access by the third party 330 to the states, metrics, and/or other attributes of IoT resources associated with (or owned by) the customer by exposing a micro-service on the host device 335 versus via an IoT management system or gateway construct. This is an open system IoT approach in which the resource itself allows access via a host micro-service definition that is completely controlled by the resource owner, as opposed to the service provider-controlled IoT management implementation.

Figure 4:
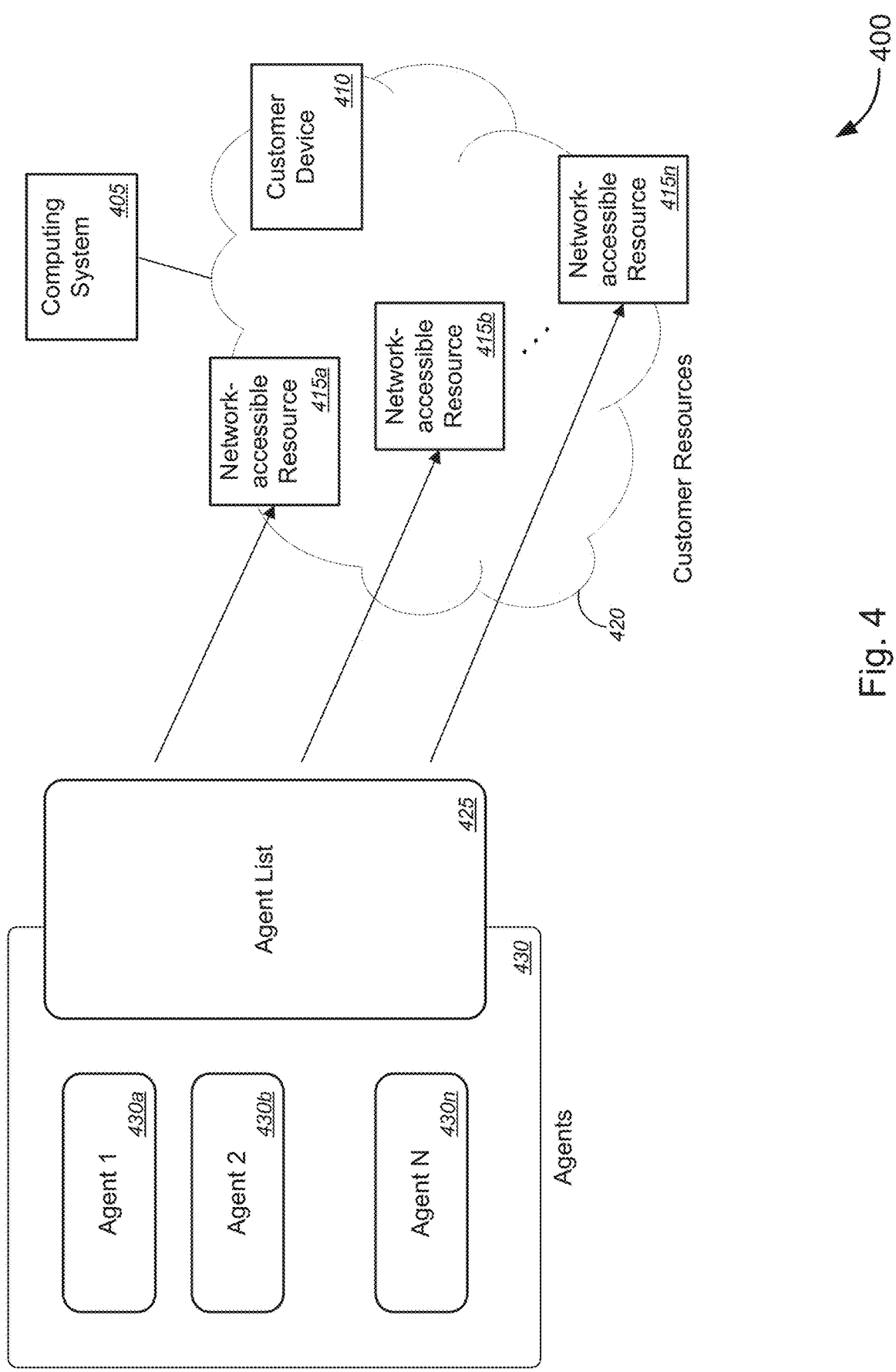
FIG. 4 is a schematic diagram illustrating an example of information brokerage usage in conjunction with implementation of customer resource use as a service, in accordance with various embodiments.

FIG. 4 is a schematic diagram illustrating an example 400 of information brokerage usage in conjunction with implementation of customer resource use as a service, in accordance with various embodiments.

In the non-limiting embodiment 400 of FIG. 4, a computing system 405 might provide customer resource usage as a service ("CRUaaS") implementation (not unlike the CRUaaS implementation as described above with respect to FIGS. 1 and 3). A customer associated with customer device 410 might own or control a plurality of network-accessible resources 415a-415n (collectively, "network-accessible resources 415" or the like), which might be disposed in customer resources network 420 or the like and which might correspond to at least one of network-accessible resources 125a-125n, 135a-135n, and/or 150a-150n of FIG. 1, user devices 120a-120n and/or 130a-130n of FIG. 1, or IoT resources 355 of FIG. 3, and/or the like.

In operation, the customer might purchase or subscribe to a service as offered by a service provider associated with computing system 405. The customer might subsequently request CRUaaS on that service and might be provided with options to select what types or levels of exposure (i.e., security or privacy exposure, or the like) that he or she would desire. As part of the CRUaaS, the customer might be provided with options to select an information broker among a list 425 of registered agents 430 (including agents 1 through N 430a-430n) as provided by the service provider. The customer might identify or select which agents 430 with whom he or she would like to share information regarding the network-accessible resources 415. In some cases, this may be accomplished via methods such as "reverse bidding" in which a customer might enter how much he or she would like to be paid over a period (e.g., a month, a quarter, or a year, etc.) for providing third parties with access to the information. If a use agent organization is willing to pay the customer's desired amount, the broker (as operated by the computing system 405) would allow the agent to access the information. The broker (as operated by the computing system 405) may also include covering the cost via a monthly cost transaction fee for the service.

Figure 5A:
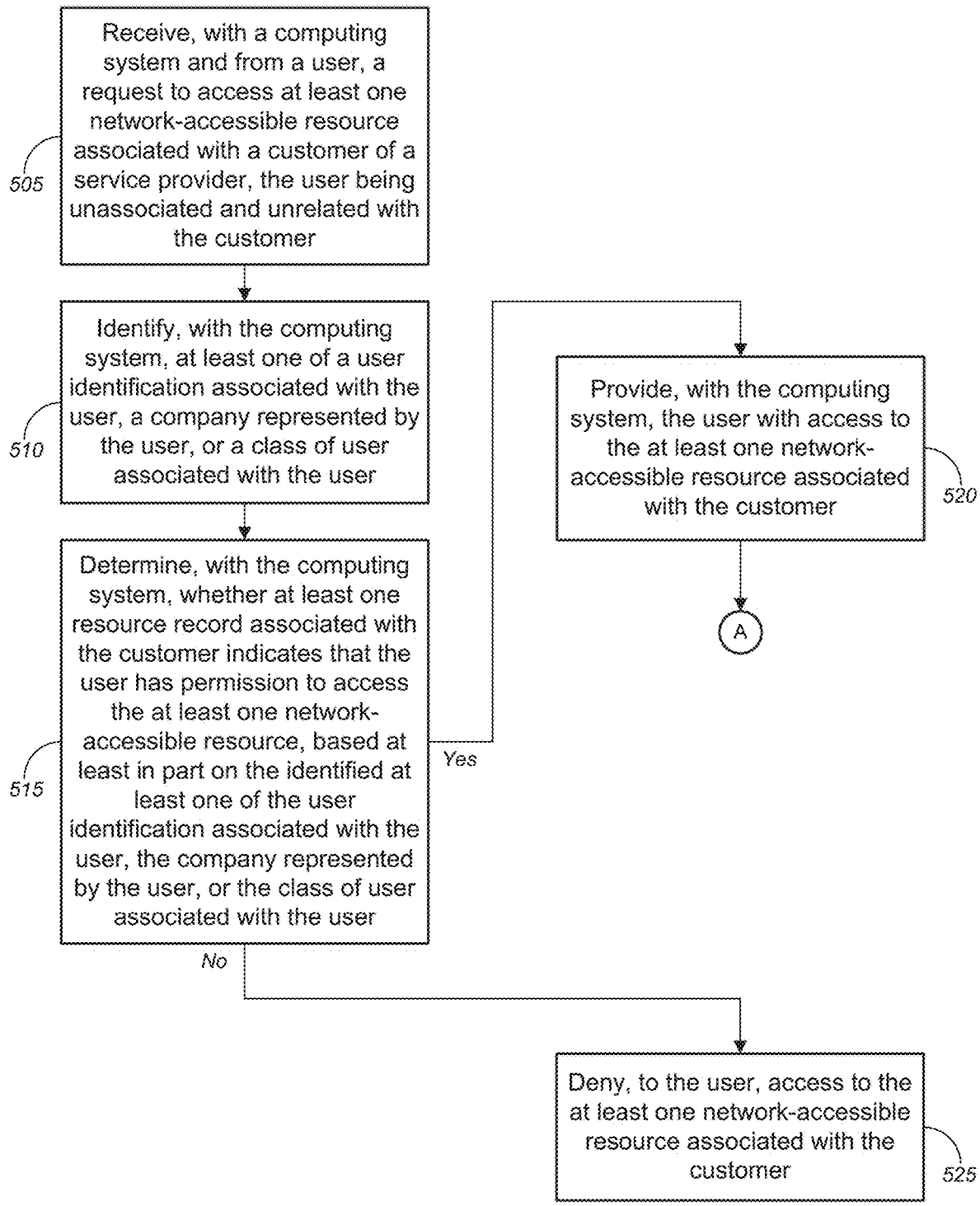
FIGS. 5A-5C are flow diagrams illustrating a method for implementing customer resource use as a service, in accordance with various embodiments.
Figure 5B:
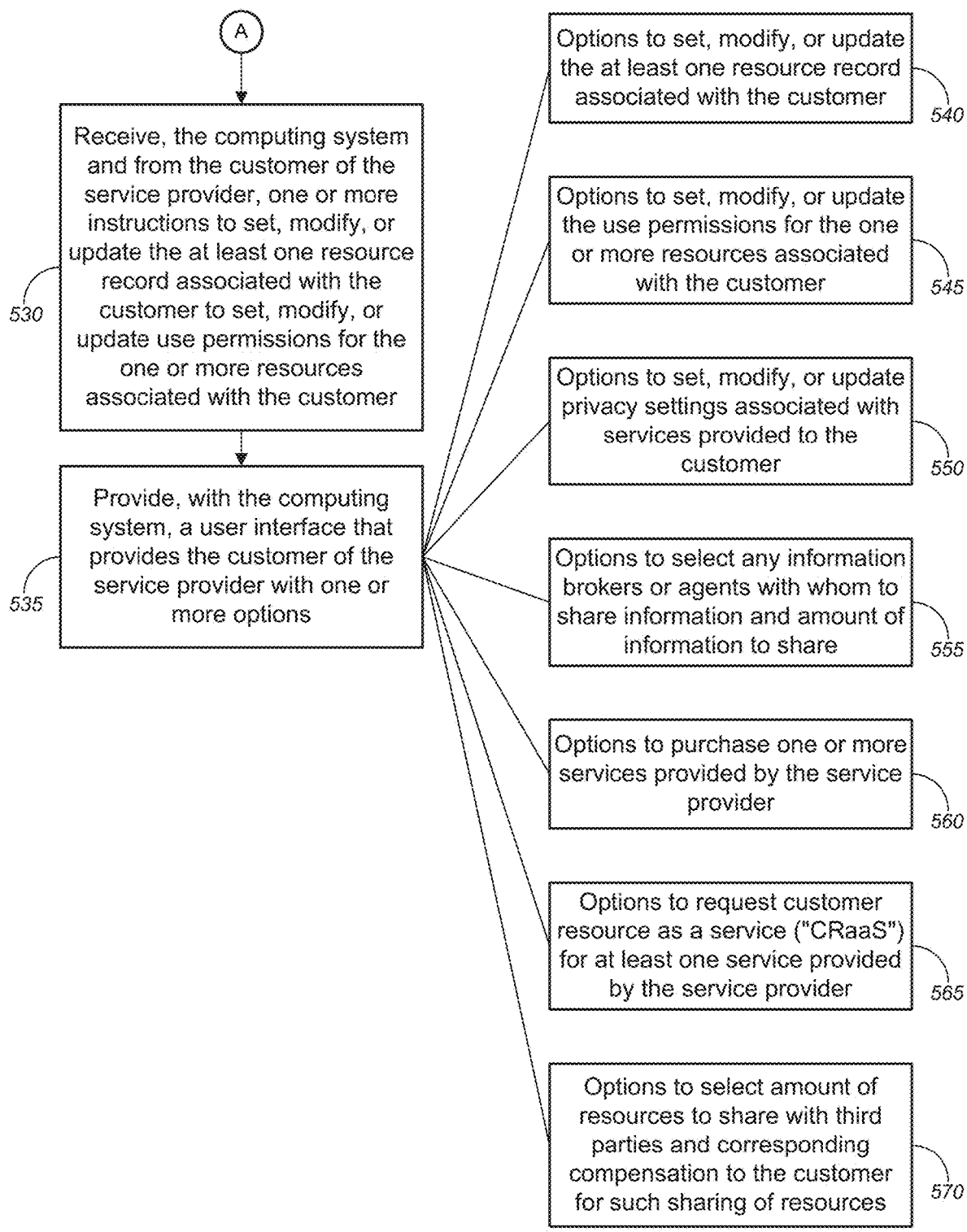
Figure 5C:
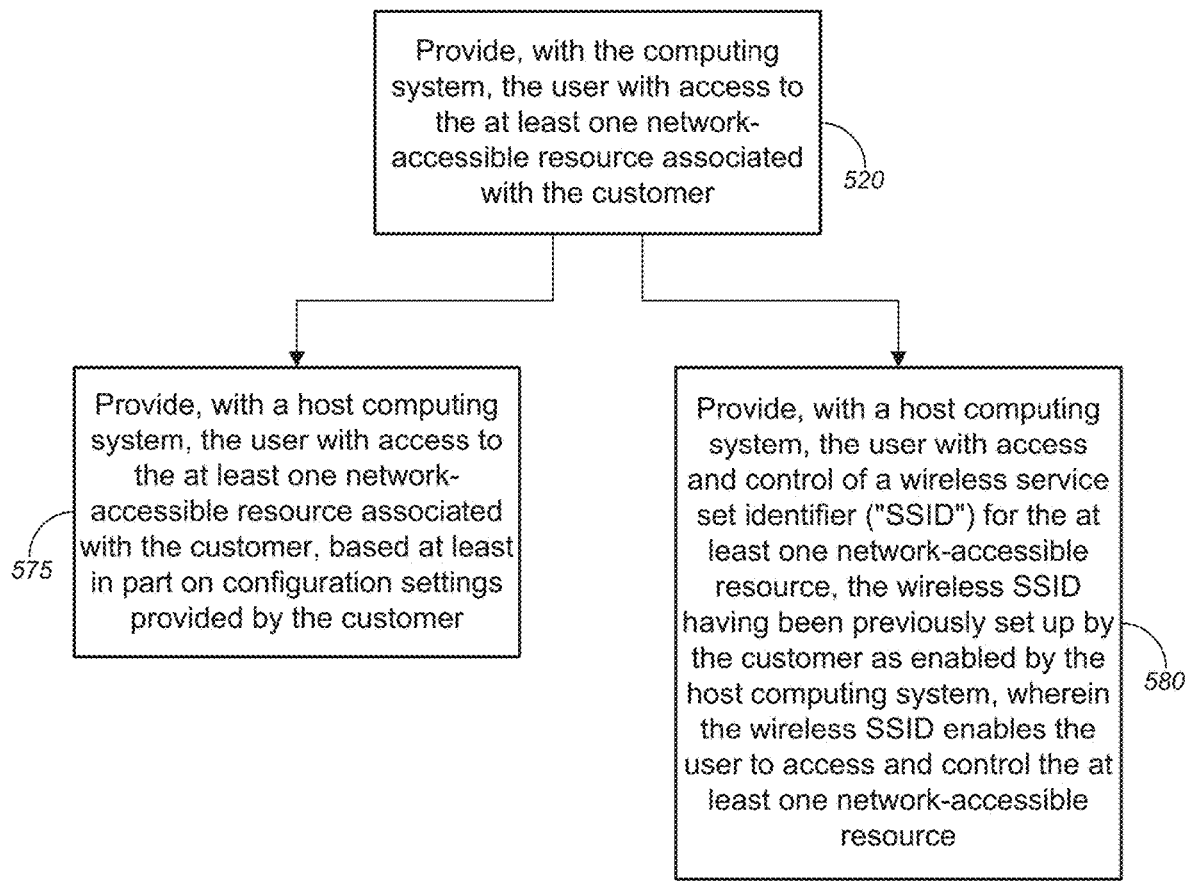

FIGS. 5A-5C (collectively, "FIG. 5") are flow diagrams illustrating a method 500 for implementing customer resource use as a service, in accordance with various embodiments. Method 500 of FIG. 5A continues onto FIG. 5B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems, examples, or embodiments 100, 200, 300, and 400 of FIGS. 1, 2, 3, and 4, respectively (or components thereof), such methods may also be implemented using any suitable hardware (or software) implementation. Similarly, while each of the systems, examples, or embodiments 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems, examples, or embodiments 100, 200, 300, and 400 of FIGS. 1, 2, 3, and 4 can each also operate according to other modes of operation and/or perform other suitable procedures.

In the non-limiting embodiment of FIG. 5A, method 500, at block 505, might comprise receiving, with a computing system and from a user, a request to access at least one network-accessible resource associated with a customer of a service provider, the user being unassociated and unrelated with the customer. In some embodiments, the computing system might include, without limitation, one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system, and/or the like.

According to some embodiments, the at least one network-accessible resource associated with the customer might each include, but is not limited to, one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource, and/or the like. In some cases, the at least one edge network resource might include, without limitation, one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system, and/or the like. In some instances, one or more of the at least one telemetry resource or the at least one customer record resource might include, but is not limited to, one or more of at least one datastore containing state information associated with the at least one network-accessible resource, at least one datastore containing metrics data associated with the at least one network-accessible resource, or at least one datastore containing one or more attributes associated with the at least one network-accessible resource, and/or the like.

At block 510, method 500 might comprise identifying, with the computing system, at least one of a user identification associated with the user, a company represented by the user, or a class of user associated with the user, and/or the like. Method 500 might further comprise, at block 515, determining, with the computing system, whether at least one resource record associated with the customer indicates that the user has permission to access the at least one network-accessible resource, based at least in part on the identified at least one of the user identification associated with the user, the company represented by the user, or the class of user associated with the user, and/or the like. The method 500 might further comprise, based on a determination that the at least one resource record associated with the customer indicates that the user has permission to access the at least one network-accessible resource, providing, with the computing system, the user with access to the at least one network-accessible resource associated with the customer (block 520). The method 500 might further comprise, based on a determination that the at least one resource record associated with the customer indicates that the user does not have permission to access the at least one network-accessible resource, denying, to the user, access to the at least one network-accessible resource associated with the customer (block 525). Method 500 might continue from block 520 onto the process at block 530 in FIG. 5B following the circular marker denoted, "A."

At block 530 in FIG. 5B (following the circular marker denoted, "A"), method 500 might further comprise receiving, with the computing system and from the customer of the service provider, one or more instructions to set, modify, or update the at least one resource record associated with the customer to set, modify, or update use permissions for the one or more resources associated with the customer. Method 500 might further comprise, at block 535, providing, with the computing system, a user interface that provides the customer of the service provider with one or more options including at least one of: options to set, modify, or update the at least one resource record associated with the customer (block 540); options to set, modify, or update the use permissions for the one or more resources associated with the customer (block 545); options to set, modify, or update privacy settings associated with services provided to the customer (block 550); options to select any information brokers or agents with whom to share information and amount of information to share (block 555); options to purchase one or more services provided by the service provider (block 560); options to request customer resource as a service ("CRaaS") or customer resource use as a service ("CRUaaS") for at least one service provided by the service provider (block 565); or options to select amount of resources to share with third parties and corresponding compensation to the customer for such sharing of resources (block 570); and/or the like.

With reference to FIG. 5C, providing, with the computing system, the user with access to the at least one network-accessible resource associated with the customer (at block 520) might comprise providing, with a host computing system, the user with access to the at least one network-accessible resource associated with the customer, based at least in part on configuration settings provided by the customer (block 575). Alternatively, providing, with the computing system, the user with access to the at least one network-accessible resource associated with the customer (at block 520) might comprise providing, with a host computing system, the user with access and control of a wireless service set identifier ("SSID") for the at least one network-accessible resource, the wireless SSID having been previously set up by the customer as enabled by the host computing system, wherein the wireless SSID enables the user to access and control the at least one network-accessible resource (block 580).

Exemplary System and Hardware Implementation

Figure 6:
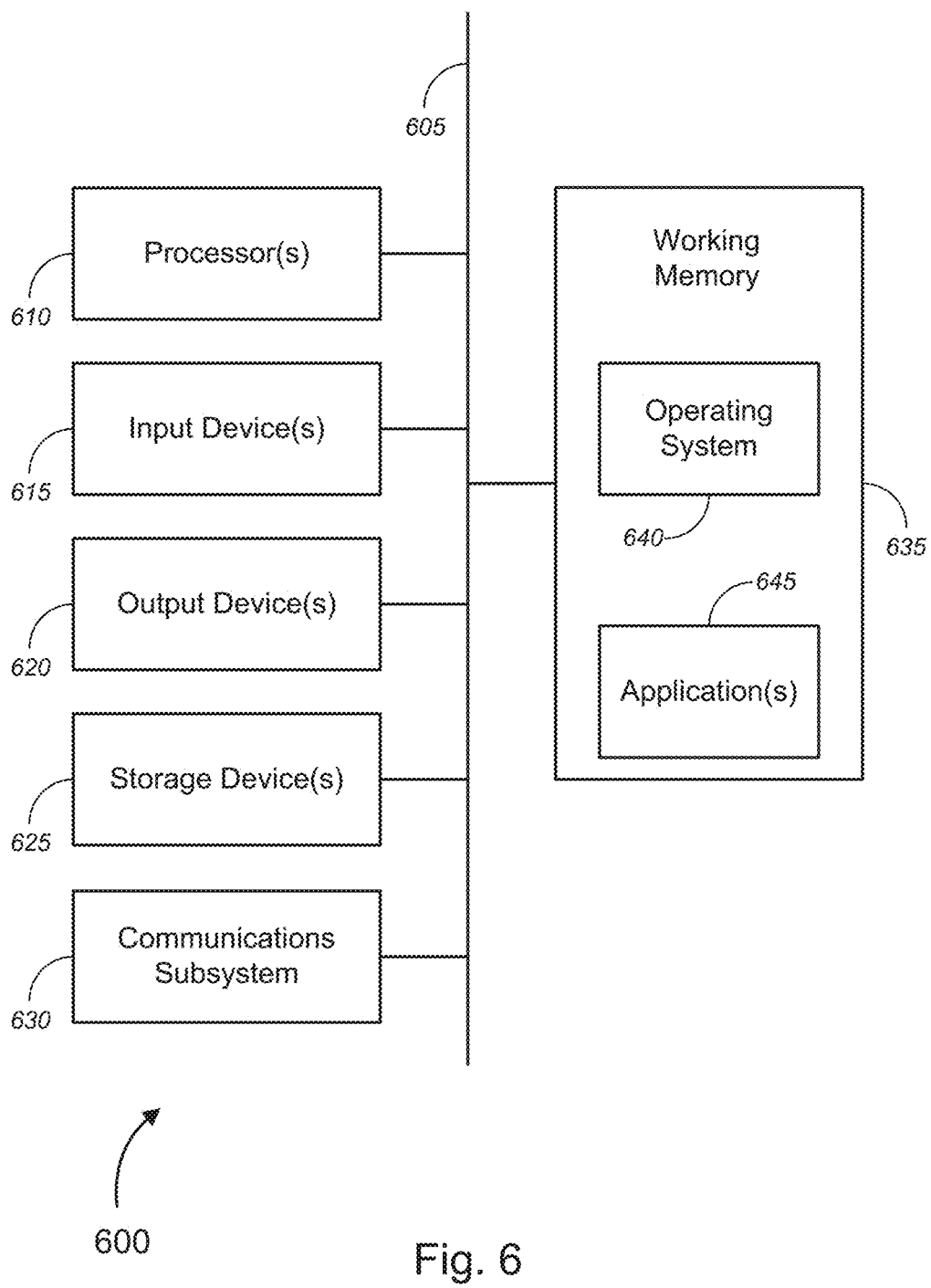
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., computing systems 105 and 405, user devices 120a-120n, 130a-130n, and 155a-155n, network-accessible resources 125a-125n, 135a-135n, 150a-150n, and 415a-415n, gateway devices 145a-145n, highway 101 integration system or enterprise application integration ("EAI") platform 205, Internet of Things ("IoT") gateway 210 and 305, controller board and software development kit ("SDK") 220, edge devices 225, IoT platforms 230a-230n, enterprise manufacturing systems 235, embedded middleware 240a-240c, enterprise in-house system 270, IoT management system 310, IoT registration proxy 315, IoT devices 320, host device 335, host application programming interface ("API") 340, full resource infrastructure as a service ("IaaS") 345, IoT resources 355, customer record as a service system 360, and customer device 410, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., computing systems 105 and 405, user devices 120a-120n, 130a-130n, and 155a-155n, network-accessible resources 125a-125n, 135a-135n, 150a-150n, and 415a-415n, gateway devices 145a-145n, highway 101 integration system or EAI platform 205, IoT gateway 210 and 305, controller board and SDK 220, edge devices 225, IoT platforms 230a-230n, enterprise manufacturing systems 235, embedded middleware 240a-240c, enterprise in-house system 270, IoT management system 310, IoT registration proxy 315, IoT devices 320, host device 335, host API 340, full resource IaaS 345, IoT resources 355, customer record as a service system 360, and customer device 410, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard, and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire, and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
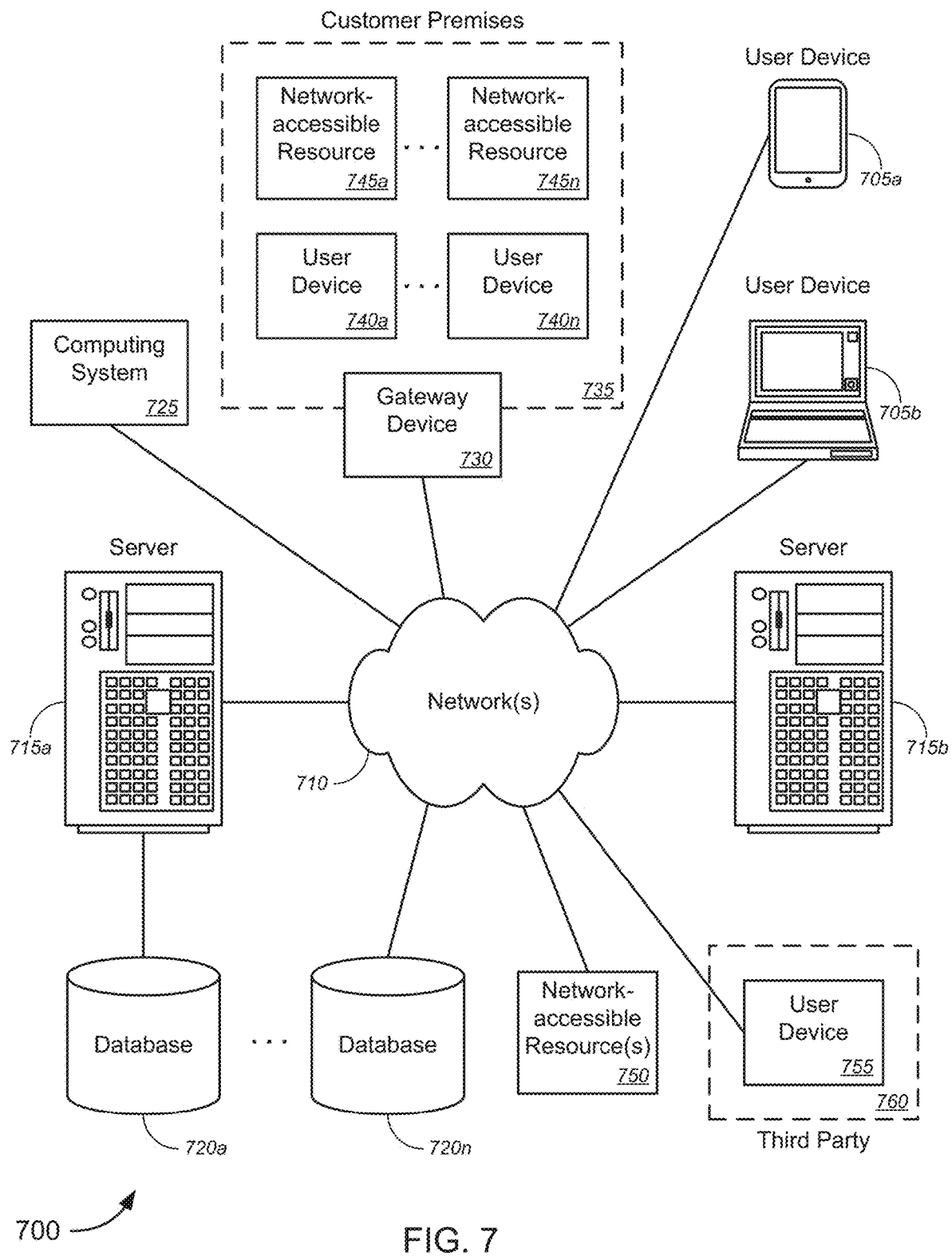
FIG. 7 is a block diagram illustrating a networked system of computers, computing systems, or system hardware architecture, which can be used in accordance with various embodiments.

As noted above, a set of embodiments comprises methods and systems for implementing dissemination and access of network-accessible resources, and, more particularly, to methods, systems, and apparatuses for implementing customer resource telemetry and use as a service. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network(s) 115, 325, and 420 of FIGS. 1, 3, and 4, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing dissemination and access of network-accessible resources, and, more particularly, to methods, systems, and apparatuses for implementing customer resource telemetry and use as a service, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (and/or a user computer, user device, or customer device 705). Alternatively, a database 720n can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise computing system 725 (similar to computing systems 105 and 405 of FIGS. 1 and 4, or the like), gateway device 730 (similar to gateway devices 145a-145n, 210, and 305 of FIGS. 1-3, or the like), user devices 740a-740n (similar to user devices 120a-120n and 130a-130n of FIG. 1, or the like), network-accessible resources 745a-745n (similar to network-accessible resources 125a-125n, 135a-135n, and 415a-415n of FIGS. 1 and 4, or the like). The gateway device 730, the user devices 740a-740n, and the network-accessible resources 745a-745n might be disposed within customer premises 735. The system 700 might further comprise network-accessible resources 750 that are remote from the customer premises 735 (similar to network-accessible resources 150a-150n of FIG. 1, or the like). The system 700 might further comprise user device 755 associated third party 760 (similar to user devices 155a-155n associated with third parties 160a-160n of FIG. 1, or the like).

In operation, the computing system 725 or gateway device 730 (collectively, "computing system" or the like) might receive, from the user device 755 of the third party user 760, a request to access at least one network-accessible resource 745a-745n and/or 750 associated with a customer of a service provider, the user being unassociated and unrelated with the customer. The computing system might identify at least one of a user identification associated with the user 760, a company represented by the user 760, or a class of user associated with the user 760, and/or the like. The computing system might determine whether at least one resource record associated with the customer indicates that the user has permission to access the at least one network-accessible resource 745a-745n and/or 750, based at least in part on the identified at least one of the user identification associated with the user 760, the company represented by the user 760, or the class of user associated with the user 760, and/or the like. Based on a determination that the at least one resource record associated with the customer indicates that the user has permission to access the at least one network-accessible resource, the computing system might provide the user 760 with access to the at least one network-accessible resource 745a-745n and/or 750 associated with the customer. Based on a determination that the at least one resource record associated with the customer indicates that the user does not have permission to access the at least one network-accessible resource, the computing system might deny, to the user 760, access to the at least one network-accessible resource 745a-745n and/or 750 associated with the customer.

These and other functions of the system 700 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system and from a user, a request to access at least one network-accessible resource associated with a customer of a service provider, the user being unassociated and unrelated with the customer;

identifying, with the computing system, at least one of a user identification associated with the user, a company represented by the user, or a class of user associated with the user;

determining, with the computing system, whether at least one resource record associated with the customer indicates that the user has permission to access the at least one network-accessible resource, based at least in part on the identified at least one of the user identification associated with the user, the company represented by the user, or the class of user associated with the user;

based on a determination that the at least one resource record associated with the customer indicates that the user has permission to access the at least one network-accessible resource, providing, with the computing system, the user with access to the at least one network-accessible resource associated with the customer, based at least in part on configuration settings provided by the customer;

based on a determination that the at least one resource record associated with the customer indicates that the user does not have permission to access the at least one network-accessible resource, denying, to the user, access to the at least one network-accessible resource associated with the customer;

receiving, with the computing system and from the customer of the service provider, one or more instructions to set, modify, or update the at least one resource record associated with the customer to set, modify, or update use permissions for the one or more resources associated with the customer; and providing, with the computing system, a user interface that provides the customer of the service provider with at least options to select any information brokers or agents with whom to share information and amount of information to share, wherein providing, with the computing system, the user with access to the at least one network-accessible resource associated with the customer comprises:

providing, with a host computing system, the user with access and control of a wireless service set identifier ("SSID") for the at least one network-accessible resource, the wireless SSID having been previously setup by the customer as enabled by the host computing system, wherein the wireless SSID enables the user to access and control the at least one network-accessible resource, the at least one network-accessible resource is separate from a gateway device for a network associated with the wireless SSID, and the user interface further provides the customer of the service provider with at least one of:

options to set, modify, or update the at least one resource record associated with the customer;

options to set, modify, or update the use permissions for the one or more resources associated with the customer;

options to set, modify, or update privacy settings associated with services provided to the customer;

options to purchase one or more services provided by the service provider;

options to request customer resource use as a service ("CRUaaS") for at least one service provided by the service provider; or options to select amount of resources to share with third parties and corresponding compensation to the customer for such sharing of resources.

2. The method of claim 1, wherein the computing system comprises one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system.

3. The method of claim 1, wherein the at least one network-accessible resource associated with the customer each comprises one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource.

4. The method of claim 3, wherein the at least one edge network resource comprises one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system.

5. The method of claim 3, wherein one or more of the at least one telemetry resource or the at least one customer record resource comprises one or more of at least one datastore containing state information associated with the at least one network-accessible resource, at least one datastore containing metrics data associated with the at least one network-accessible resource, or at least one datastore containing one or more attributes associated with the at least one network-accessible resource.

6. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:

receive, from a user, a request to access at least one network-accessible resource associated with a customer of a service provider, the user being unassociated and unrelated with the customer;

identify at least one of a user identification associated with the user, a company represented by the user, or a class of user associated with the user;

determine whether at least one resource record associated with the customer indicates that the user has permission to access the at least one network-accessible resource, based at least in part on the identified at least one of the user identification associated with the user, the company represented by the user, or the class of user associated with the user;

based on a determination that the at least one resource record associated with the customer indicates that the user has permission to access the at least one network-accessible resource, provide the user with access to the at least one network-accessible resource associated with the customer, based at least in part on configuration settings provided by the customer;

based on a determination that the at least one resource record associated with the customer indicates that the user does not have permission to access the at least one network-accessible resource, deny, to the user, access to the at least one network-accessible resource associated with the customer;

receive, from the customer of the service provider, one or more instructions to set, modify, or update the at least one resource record associated with the customer to set, modify, or update use permissions for the one or more resources associated with the customer; and provide a user interface that provides the customer of the service provider with at least options to select any information brokers or agents with whom to share information and amount of information to share, wherein providing the user with access to the at least one network-accessible resource associated with the customer comprises:

providing, with a host computing system, the user with access and control of a wireless service set identifier ("SSID") for the at least one network-accessible resource, the wireless SSID having been previously setup by the customer as enabled by the host computing system, wherein the wireless SSID enables the user to access and control the at least one network-accessible resource, the at least one network-accessible resource is separate from a gateway device for a network associated with the wireless SSID, and the user interface further provides the customer of the service provider with at least one of:

options to set, modify, or update the at least one resource record associated with the customer;

options to set, modify, or update the use permissions for the one or more resources associated with the customer;

options to set, modify, or update privacy settings associated with services provided to the customer;

options to purchase one or more services provided by the service provider;

options to request customer resource use as a service ("CRUaaS") for at least one service provided by the service provider; or options to select amount of resources to share with third parties and corresponding compensation to the customer for such sharing of resources.

7. The apparatus of claim 6, wherein the apparatus comprises one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system.

8. The apparatus of claim 6, wherein the at least one network-accessible resource associated with the customer each comprises one or more of at least one network resource, at least one edge network resource, at least one compute resource, at least one data storage resource, at least one telemetry resource, at least one Internet of things ("IoT") resource, at least one network-accessible household resource, at least one customer premises security resource, at least one wireless device resource, at least one microservice resource, or at least one customer record resource.

9. The apparatus of claim 8, wherein the at least one edge network resource comprises one or more of at least one agricultural device, at least one healthcare device, at least one vehicle, at least one home appliance, at least one office device, at least one entertainment device, at least one surveillance device, at least one lighting device, at least one gas-operated device, at least one solar-powered device, at least one battery-powered device, or at least one building system.

10. The apparatus of claim 8, wherein one or more of the at least one telemetry resource or the at least one customer record resource comprises one or more of at least one datastore containing state information associated with the at least one network-accessible resource, at least one datastore containing metrics data associated with the at least one network-accessible resource, or at least one datastore containing one or more attributes associated with the at least one network-accessible resource.

11. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, from a user, a request to access at least one network-accessible resource associated with a customer of a service provider, the user being unassociated and unrelated with the customer;

identify at least one of a user identification associated with the user, a company represented by the user, or a class of user associated with the user;

determine whether at least one resource record associated with the customer indicates that the user has permission to access the at least one network-accessible resource, based at least in part on the identified at least one of the user identification associated with the user, the company represented by the user, or the class of user associated with the user;

based on a determination that the at least one resource record associated with the customer indicates that the user has permission to access the at least one network-accessible resource, provide the user with access to the at least one network-accessible resource associated with the customer, based at least in part on configuration settings provided by the customer;

based on a determination that the at least one resource record associated with the customer indicates that the user does not have permission to access the at least one network-accessible resource, deny, to the user, access to the at least one network-accessible resource associated with the customer;

receive, from the customer of the service provider, one or more instructions to set, modify, or update the at least one resource record associated with the customer to set, modify, or update use permissions for the one or more resources associated with the customer; and provide a user interface that provides the customer of the service provider with at least options to select any information brokers or agents with whom to share information and amount of information to share, wherein providing, with the computing system, the user with access to the at least one network-accessible resource associated with the customer comprises:

providing the user with access and control of a wireless service set identifier ("SSID") for the at least one network-accessible resource, the wireless SSID having been previously setup by the customer as enabled by the host computing system, wherein the wireless SSID enables the user to access and control the at least one network-accessible resource, the at least one network-accessible resource is separate from a gateway device for a network associated with the wireless SSID, and the user interface further provides the customer of the service provider with at least one of:

options to set, modify, or update the at least one resource record associated with the customer;

options to set, modify, or update the use permissions for the one or more resources associated with the customer;

options to set, modify, or update privacy settings associated with services provided to the customer;

options to purchase one or more services provided by the service provider;

options to request customer resource use as a service ("CRUaaS") for at least one service provided by the service provider; or options to select amount of resources to share with third parties and corresponding compensation to the customer for such sharing of resources.

12. The system of claim 11, wherein the computing system comprises one of a gateway device, an Internet of things ("IoT") gateway device, a host device, a host computing system, a host server system, a customer resource use as a service ("CRUaaS") platform, a server computer over a network, a cloud-based computing system over a network, a cloud infrastructure as a service ("IaaS") platform, or a distributed computing system.

* * * * *